United States Patent [19]

Seimiya et al.

[11] 4,436,402

[45] Mar. 13, 1984

[54] COPYING MACHINE

[75] Inventors: Ryubun Seimiya; Fumio Iwai; Isao Nosaka, all of Hachioji, Japan

[73] Assignee: Konishiroku Photo Industry, Tokyo, Japan

[21] Appl. No.: 205,694

[22] Filed: Nov. 10, 1980

[30] Foreign Application Priority Data

Nov. 12, 1979 [JP] Japan .................. 54-145514

[51] Int. Cl.³ .................................................. G03G 15/04
[52] U.S. Cl. ........................................ 355/3 R; 355/75
[58] Field of Search ............................. 355/3 R, 7, 75

[56] References Cited

U.S. PATENT DOCUMENTS

| | | | |
|---|---|---|---|
| 4,126,389 | 11/1978 | Ikeda et al. | 355/8 X |
| 4,256,400 | 3/1981 | Komori et al. | 355/7 X |
| 4,260,248 | 4/1981 | Murata et al. | 355/75 X |
| 4,302,098 | 11/1981 | Kan et al. | 355/8 X |

Primary Examiner—Fred L. Braun
Attorney, Agent, or Firm—Jordan B. Bierman; Linda Bierman; C. Cornell Remsen, Jr.

[57] ABSTRACT

In a copying machine in which the distance of projection scanning is varied by relative movement between the copy board and the optical system in accordance with the size of the original, indices are provided on the copy board for positioning the original so that the shorter side of the original always corresponds to the direction of scanning. This unification of original placement results not only in a shortening in the distance of the projection scanning but an increase in copying speed.

1 Claim, 2 Drawing Figures

COPYING MACHINE

BACKGROUND OF THE INVENTION

1. Field of the Invention

The present invention relates to a improvement in copying machines such as electrophotographic copying machines wherein the distance of the projection scanning for the original is variable.

The projection scanning of an original as stated in the specification of the present invention, means the exposure scanning obtained from the relative movement between a copy board for holding the original to be copied and an optical means including an illuminating lamp to project an image of the original onto a drum, specifically for example, onto the photosensitive layer on the surface thereof. Therefore, it is independent of whether the copy board is movable type or fixed type; accordingly, the present invention can be applied to either type described above.

2. Description of the Prior Art

In a conventional copying machine wherein the distance of the projection scanning for the original, i.e., the traveling distance of the optical system (for convenience' sake, the optical system means the illuminating lamp here) in the fixed type copy board for example, is variable, an arrangement has been employed wherein when the size of the copy paper or transfer paper (hereinafter referred to simply as papers) is A4 or B5 (FIG. 1), papers are fed in the feeding direction of the shorter side thereof, while in case the size of paper is A3 or B4, papers are fed in the feeding direction of the longer side thereof. Namely, though there has been a certain relation between the original to be placed on the copy board and papers to be used for said original (imagining the case that the copy board and the path for papers are in parallel leads to a prompt understanding). In case of copying with a one-to-one magnification, for example, when papers to be used are fed in the direction of the corresponding width thereof for the width of the original when viewed in the direction perpendicular to the direction of the traveling path of said papers, the ways of placing such papers on the copy board have been different from one another according to the size of the original. The distance of projection scanning, in case the size of the original is A4 or B5, has been made the same as the shorter side of A4 size, and in case the size of the original is A3 or B4 has been made the same as the longer side of A3 size, and thus has been made changeable in two steps. In such a copying machine, in spite of the requirement to increase the copying speed for the large size paper such as A3, B4, it is not easy, due to the limitation of mechanical and electrical control, to meet the requirement for high speed copying which has recently been desired without lowering the image quality and the stability of the device, even if an increase in the operating speed of the entire copying machine is possible. Such controlling method or original placement method has been determined from the view point of ease of operation, and such method has been effected with little trouble since no consideration for the function of reduction and enlargement has been taken. However, when it is desired that such device is given the function of reduction and enlargement, the weak point thereof becomes clearly disclosed, including the damage extending to the shape of the cassette. For example, if it is possible for the conventional copying machine to make even a variable magnification copying as stated above, for the difference between the case of one-to-one magnification projection copying and the case of variable magnification projection copying, the complication that the direction of placing on the copy board should be changed even for the same size original, or the direction of papers to be used should be changed with same direction of placing the original, is disclosed. Namely, in case the original of A3 size is copied on the paper of A3 size with a one-to-one magnification for example, the direction of placing of the original is equated with the feeding direction of papers of A3 size, but in case the original of A3 size is copied on the A4 size paper with a reduction, the direction of the placing of the original should be equated with the feeding direction of the A4 size paper. Otherwise, problems that copied images do not appear or an extreme margin is produced on one side may happen. On the contrary, when the original of A3 size is placed in the same manner as the one-to-one magnification copying, the feeding direction of the A4 size paper should be changed to the direction that is the same as in the case of one-to-one magnification copying wherein A3 size papers are used, in order to prevent the occurrence of the above-mentioned problems. Namely, in case of one-to-one magnification copying, the direction of the shorter side of the A4 size paper is the feeding direction thereof and when the original of A3 size is copied onto the A4 size paper with reduction, the direction of the longer side of the A4 size paper should be the feeding direction thereof. By doing that, the weak point that not only the device becomes complicated concerning the supply of the paper but also the handling thereof is troublesome, is produced. Inconvenience caused by the relative relation between the original and the paper in the conventional copying machine mentioned above will also result even for the case wherein the projection copying with an enlargement is made.

SUMMARY OF THE INVENTION

An object of the present invention is to propose a copying machine wherein the aforesaid problems have been solved, and particularly the present invention is characterized in that the feeding direction for all types of papers is unified in the direction of the shorter side thereof, and the position base for the positioning of the original, accordingly the position base for the supply of the paper is a central base in the copying machine wherein the distance of the projection scanning for the original is variable. More particularly, an object of the present invention is to propose a copying machine wherein the distance of projection scanning for an original to be copied which is made by relative movement between a copy board and an optical means is variable according to the size of the original, in which the improvement of the machine comprises: indexing means for indicating an area for originals to be positioned on the copy board so that the shorter side of the original corresponds to the direction for projection scanning, and a setting portion for setting the copy sheet so that the feeding direction for all of copy papers to be used is unified in the direction of the shorter side thereof, wherein the position base for positioning of the originals and for copy papers is a central base. An other object of the present invention is to propose a copying machine wherein variable magnification projecting means is taken into consideration. Another object of the present invention is to offer a copying machine wherein appropriate cassettes are used for the copy papers to be supplied.

Namely, in the copying machine of the present invention, since the feeding direction for all types of papers is unified in the direction of the shorter side thereof, the direction of placing of the original is unified so that the projection scanning is made in the direction of the shorter side, and therefore it is possible to shorten the distance of the projection scanning; accordingly an increase of copying speed for large size copying is possible without increasing the operation speed for the entire copying machine in particular, and in case the variable magnification projection copying is used, it is not necessary to change the direction of placing of the original and of the copy paper against the case of one-to-one magnification copying, and it is possible to make the machine small. Further, in the present invention, owing to the position base for placing of the original that is a central base, the excellent result that no changing of supplying position of papers is needed for the case of one-to-one magnification projection copying and the case of variable magnification projection copying, and that the device itself and handling thereof do not change, concerning the supply of the paper, for the case of one-to-one magnification copying and of variable magnification copying. A special cassette such as the cassette for variable magnification copying, even for the case wherein the papers are supplied from the cassette.

The present invention will be explained as follows based upon the drawings.

DETAILED DESCRIPTION OF THE PREFERRED EMBODIMENT

Figure 1:
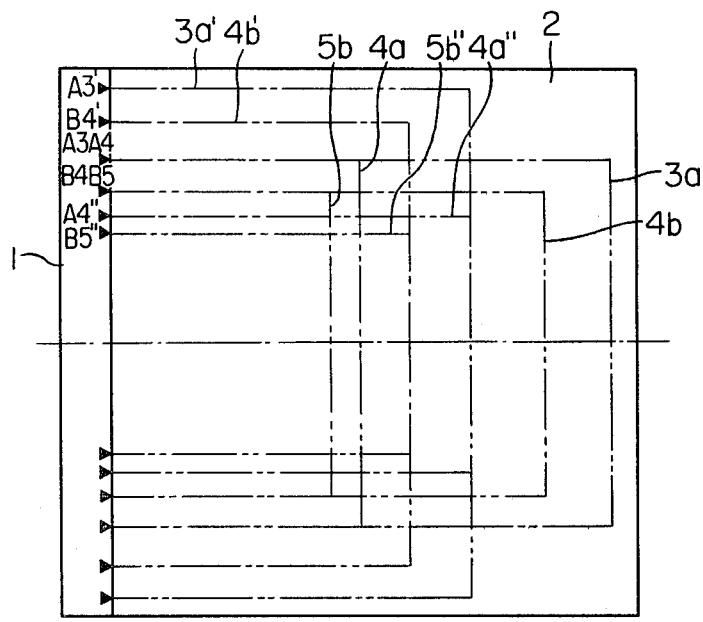
FIG. 1 is a top plan view of the copy board of the conventional copying machine wherein the position base for placing of the original is the central base (Central base means the center line indicated with a dash-and-dotted line in the direction of scanning on the copy board 2 in the drawing)

In the drawing, 1 denotes an index plate for indicating an area for originals to be positioned on the copy board 2 made of a transparent plate (usually glass). On the index plate position indexes for placing the originals of A3, A4, B4 and B5 sizes are provided and in case of one-to-one magnification projection copying, the original is placed according to the position index for placing of the original like 3a for the original of A3 size, 4a for A4 size original, 4b for B4 size and 5b for B5 size. In the copying operation, the original placed on said copy board 2 is given a projection scanning in the direction perpendicular to the longitudinal direction of the index plate 1 by the relative movement of the optical system (not shown) or of means comprising an illuminating lamp (not shown) provided under the copy board, and the scanning is effected by changing the scanning distance in 4 steps corresponding to the length in the scanning direction of each size original, or in 2 steps corresponding to the length in the scanning direction of A4 size original and A3 size original. The direction of the papers is the same as for the placing of the original, and the papers are fed in a direction that is the same as the one for the projection scanning. Therefore, as is clear from a comparison between FIG. 1 and FIG. 2, it is possible to shorten the projection scanning distance in the copying machine of the present invention shown in FIG. 2 for the copying of the originals of A3 and B4 sizes, compared with the conventional copying machine, in either the case of 4 steps variable scanning distance or 2 steps variable scanning distance, since the projection scanning is made along the shorter side of original to be copied, and the copying speed is increased accordingly. At that time, the feeding direction for all of copy papers to be used is unified in the direction of the shorter side thereof. Meanwhile, the position indexes A3′ and B4′ in FIG. 1 indicate the placing positions of the originals for the case wherein the originals of A3 size and B4 size are copied with a reduction projection onto the papers of A4 size and B5 size which are half of A3 size and B4 size respectively, and originals of A3 size and B4 size are placed like 3a′ and 4b′ according to position indexes A3′ and B4′ respectively. The placing direction of the orginal in this case is different by 90° compared with the case of one-to-one magnification projection copying. This means, compared with the present invention as stated above, that the conventional copying machine must be large in size by the amount that the length in the projection scanning direction of the original of A3 size in one-to-one magnification projection copying, is longer. Further, the position indexes A4″ and B5″ indicate the placing positions of the orginal for the case wherein the originals of A4 size and B5 size are copied with enlargement projection onto the papers of A3 size and B4 size, which are double the originals in size and also in this case the direction of placement of the original is different by 90° from the case of one-to-one magnification projection copying and have been placed like 4a″ and 5b″. The placement method of the original for variable magnification projection copying in such conventional copying machine is to utilize the same cassette as it is on the one wherein papers are supplied from the cassette by making the supply position or setting position (not shown) of papers the same as the one for one-to-one magnification projection copying and if the original is placed like the case of one-to-one magnification projection copying, then it is necessary to change the direction of papers, and the supply position for the main frame of the device is changed and, in the one wherein a cassette is used, it is necessary to prepare the appropriate cassette for variable magnification, causing the device and operation to be extremely troublesome for switching.

Figure 2:
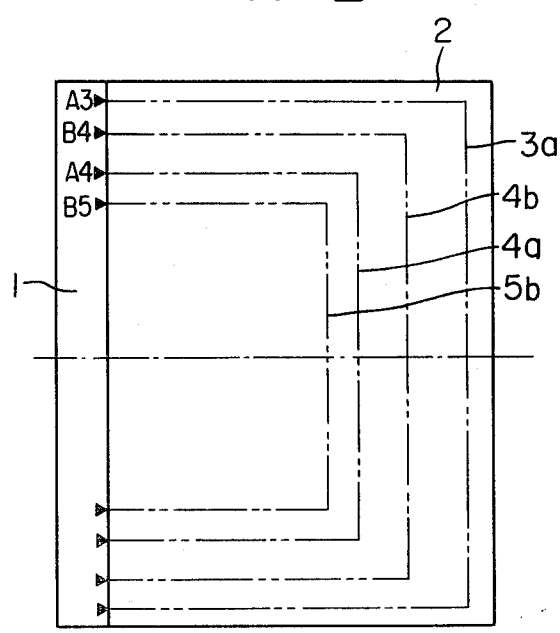
FIG. 2 is a top plan view of a copy board of the copying machine of the present invention, wherein the position base for placing of the original is also the central base.

In the example shown in FIG. 2, to the contrary, in case the originals of A3 size and B4 size are copied with ½ reduction projection, if the originals of A3 size and B4 size are placed at 3a and 4b for one-to-one magnification copying, copying is made in the same manner as the case wherein the originals of A4 size and B5 size are placed in the positions 4a and 5b respectively for one-to-one magnification projection copying and therefore, the supply of the papers can be fully the same as the supply of A4 size and B5 size for one-to-one magnification projection copying. The foregoing can similarly be said for the case wherein the originals of A4 size and B5 size are copied with two times enlargement projection, and by the present invention, therefore, it is absolutely unnecessary to change the placement direction of the original or to change the direction of papers and the supply position thereof at the sheet setting position or portion (not shown) or to prepare the cassette for variable magnification. As stated earlier, the copying speed is therefore increased and as a result the machine can be smaller due to the short length in the direction of projection scanning of the original.

In the present invention mentioned above, the size of the original and the size of papers are naturally not limited to the range between B5 size and A3 size and as stated above, the projection scanning of the original may be made either by the travel of the copy board or by the travel of the projection optical system. Incidentally, in the specification of this invention, the controlling variable magnification projection means to vary the traveling distance (scanning distance) of the optical system; the structure of the copying machines including the transfer type etc. are not illustrated since they are publicly known from copying machines on the actual market or from the documentary records etc.

What is claimed is:

1. In an electrophotographic copying machine of the type in which an original placed upon a copy board is scanned and its image projected upon a photosensitive surface, and in which the effective distance between said original and the photosensitive surface may be varied depending upon the size of the original to be scanned, the improvement comprising indexing means on said copy board indicating the placement of the original to be scanned relative to a central base line, said indexing means being so dimensioned that the shorter side of the original always corresponds to the direction of scanning.

* * * * *